(12) United States Patent
Irvin

(10) Patent No.: US 6,192,236 B1
(45) Date of Patent: Feb. 20, 2001

(54) APPARATUS AND METHODS FOR REMOTE CONTROL OF ACCESSORY DEVICES USING A RADIOTELEPHONE AS A RECEIVER

(75) Inventor: David Irvin, Raleigh, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 08/853,059

(22) Filed: May 8, 1997

(51) Int. Cl.[7] ..................................................... H04Q 7/32
(52) U.S. Cl. .......................... 455/420; 455/557; 455/573; 340/825.31
(58) Field of Search ..................................... 455/403, 420, 455/66, 556, 557, 573, 90, 347, 351, 352–354; 340/825.31, 825.44; 379/102.01, 102.02, 102.03, 102.04, 102.05, 102.06, 102.07

(56) References Cited

U.S. PATENT DOCUMENTS

| | | | |
|---|---|---|---|
| 4,353,502 | 10/1982 | Myers | 236/47 |
| 4,656,655 | 4/1987 | Hashimoto | 379/102.3 |
| 4,885,766 | 12/1989 | Yasuoka et al. | 379/102.3 |
| 4,972,457 | * 11/1990 | O'Sullivan | 455/556 X |
| 5,109,402 | * 4/1992 | Anderson et al. | 455/557 |
| 5,490,200 | * 2/1996 | Snyder et al. | 455/420 X |
| 5,548,635 | 8/1996 | Bradley et al. | 379/102.3 |
| 5,612,683 | * 3/1997 | Trempala et al. | 340/825.31 |
| 5,646,605 | * 7/1997 | Leonaggeo et al. | 340/825.31 |
| 5,815,557 | * 9/1998 | Larson | 340/825.31 X |
| 5,832,388 | * 11/1998 | Williams et al. | 455/557 |

* cited by examiner

Primary Examiner—Fan Tsang
Assistant Examiner—Philip J. Sobutka
(74) Attorney, Agent, or Firm—Myers Bigel Sibley & Sajovec

(57) ABSTRACT

Remote control commands are provided to an accessory device utilizing a radiotelephone, such as a cellular telephone, as a receiver which receives control commands over a wide area cellular network utilizing a remote control adaptor. The adaptor may take the form of a detachable adaptor attaching to the radiotelephone or a remote control battery pack replacing the normal battery pack for the radiotelephone or a docking station serving as a remote control as well as a battery charger for the radiotelephone. Alternatively, a lock box is provided allowing remote actuated access to a compartment of the lock box. The radiotelephone acts as a receiver providing an audio signal to a tone signal decoder which passes decoded and converted tone signals to a comparator which assembles a command for comparison to a predetermined password. Switches are activated responsive to the comparison to control accessory devices. Power may be provided by the switching circuit to accessory devices from the radiotelephone system bus, battery or from a separate power source. A user's radiotelephone may thereby be converted on an as needed basis to operate as a receiver for remote control of accessory devices and readily return to normal use as a radiotelephone when remote control is no longer required.

15 Claims, 9 Drawing Sheets

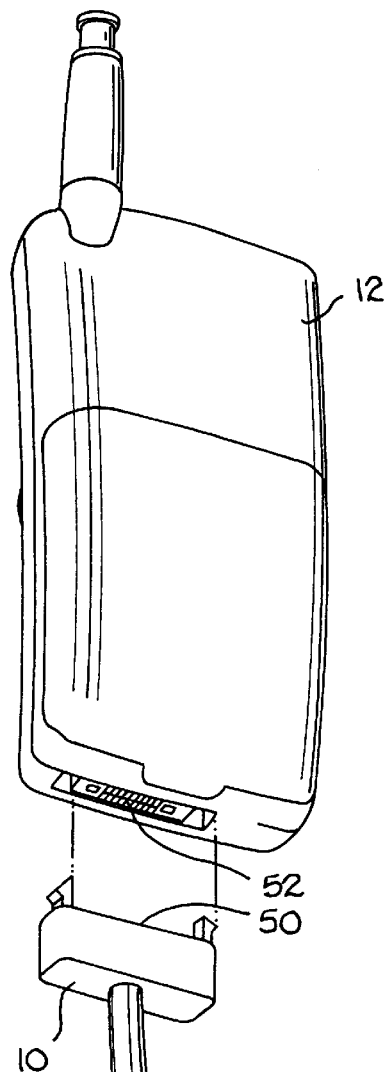
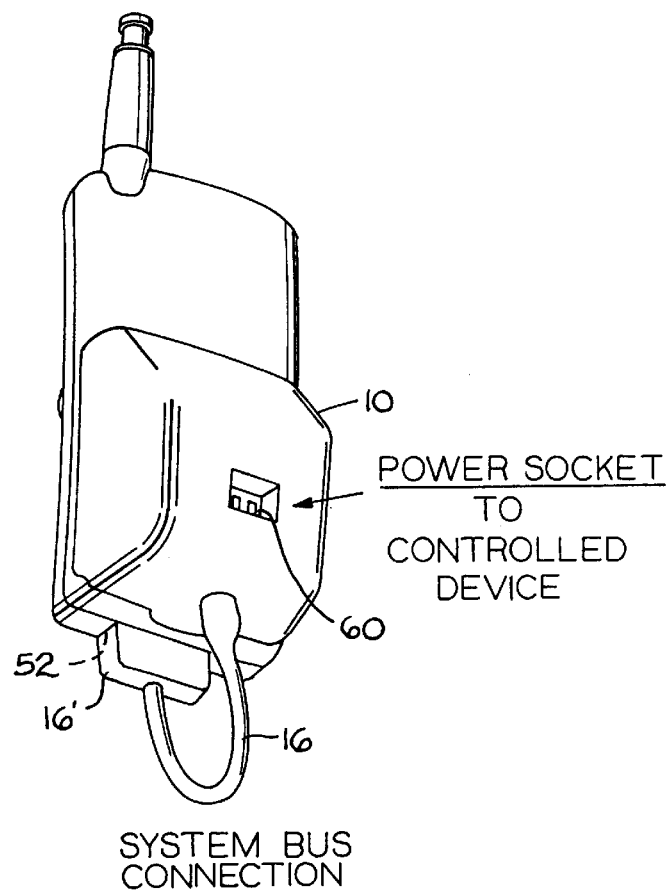
FIG. 3
TO CONTROLLED DEVICE
POWER SOCKET TO CONTROLLED DEVICE
SYSTEM BUS CONNECTION
FIG. 4

APPARATUS AND METHODS FOR REMOTE CONTROL OF ACCESSORY DEVICES USING A RADIOTELEPHONE AS A RECEIVER

FIELD OF THE INVENTION

This invention relates to remote control devices and methods and, more particularly, to remote control devices for controlling accessory devices using tone signals transmitted by telephone.

BACKGROUND OF THE INVENTION

Telephone service has been provided using Public Switched Telephone Networks (PSTN) also known as wired telephone networks and by the use of radiotelephones communicating over wide area cellular networks. Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems by Balston*, et al., published by Artech House, Norwood, Mass., 1993.

Various devices and methods are known for remotely controlling accessories such as televisions and heating and air conditioning systems. These devices include line of sight devices such as infrared devices typically used with television remote controllers and simple RF links such as those typically used with garage door openers. These approaches generally suffer from limited range and marginal transmission performance. While special-purpose radio equipment could possibly be designed with high performance and long range, the costs of producing such products for remote control applications would be expected to be prohibitive. U.S. Pat. No. 5,548,635 to Bradley et al. describes a system for controlling equipment within a telephone subscriber's premises using Dual Tone Multiple Frequency (DTMF) signals. This allows for non-line of sight remote control of devices in locations served by wired telephone lines. The use of wired telephone lines to transmit remote control commands is also discussed in U.S. Pat. No. 4,885,766 to Yauoka et al., U.S. Pat. No. 5,386,461 to Gedney, U.S. Pat. No. 4,656,655 to Hashimoto and U.S. Pat. No. 4,353,502 to Myers.

DTMF signals are typically generated by pressing the keys on a modern "tone" type telephone (as contrasted with the older "pulse" systems). In addition to providing for communication of a phone number to be contacted to the public switched telephone network, various devices have been designed to utilize these audio frequency range DTMF signals for control such as voice mailboxes and answering machines.

One limitation of the various known methods for utilizing DTMF signals transmitted over telephone lines for remote control is that they generally require a telephone outlet in the vicinity of the device to be controlled. Accordingly, there are various locations which these approaches are unsuited for use, either because no wired telephone network exists or because no telephone outlet is available in the vicinity of the device to be controlled. Furthermore, the cost of making a wire line available in the vicinity of the device to be controlled may be prohibitive if the need for remote control is only occasional.

SUMMARY OF THE INVENTION

It is, therefore, an objective of the present invention to resolve the problem of providing for remote control using tone signals, such as DTMF signals, transmitted by telephone in locations where no wired telephone line is available. To solve the problem of receiving a tone signal in a location without a wired telephone line outlet, the present invention provides devices and methods that enable a radiotelephone receiving an incoming call including tone signals from a wide area cellular network to control an accessory device in the vicinity of the radiotelephone. Various embodiments of adaptors which can be attached to a standard radiotelephone are provided so that users who already own a radiotelephone may obtain the benefits of the present invention without the burdens and costs of replacing existing equipment. The present invention has the benefit of bringing the full resources of the existing radiotelephone infrastructure to bear on the remote control application, thereby extending the reach of remote control operations to worldwide proportions while providing robust transmission performance. By utilizing existing high quality radiotelephones, whose cost has been previously absorbed to obtain voice service for the user, as receivers, the present invention provides high quality long range remote control capabilities at a favorable cost. The radiotelephone user is also allowed to obtain the benefits of remote control over the user's current service provider's network without incurring additional costs for access to a transmission network for the remote control functions.

In one embodiment of the present invention, a remote control docking station for a battery powered radiotelephone is provided. The docking station includes a portable housing, a battery charger in the housing and a tone signal decoder in the housing. Means are provided in the housing for receiving the radiotelephone and providing electrical interface therewith, electrically connecting the battery charger to the battery and further electrically connecting the tone signal decoder to an audio output line of the radiotelephone when the radiotelephone is in the housing. Switching means is provided in the housing and operatively connected to the tone signal decoder for switching a control output responsive to a tone signal or sequence of tone signals received and converted by the tone signal decoder. The switching means may be electrically connected to the battery charger and may switch the control output between a state connected to and disconnected from the battery charger. In one embodiment, the remote control docking station further includes power line connecting means connecting to a power source and the switching means switches the control output between a state connected to and disconnected from the power source.

In another aspect of the present invention, a remote control lock box is provided for a radiotelephone. The lock box includes a housing having a first and a second compartment. A first cover is connected to the housing having a first position so as to substantially close the first compartment and a second position so as to provide access to the first compartment. A second cover is connected to the housing having a first position so as to substantially close the second compartment and a second position so as to provide access to the second compartment. Mounting means is provided in the first compartment for mounting the radiotelephone within the first compartment. A tone signal decoder is provided connected to the housing for receiving and converting a tone signal received by the radiotelephone when the radiotelephone is mounted. Interface means are provided for electrically connecting the tone signal decoder to an audio output line of the radiotelephone when the radiotelephone is mounted. Switching means are operatively connected to the tone signal decoder for switching a control output responsive to a tone signal received and converted by the tone signal decoder. In one embodiment means are provided for assembling a command from a stored converted tone signal. A plurality of tone signals are sequentially received and stored and the command is assembled from the sequence of tone signals in another embodiment. Locking means are provided in the housing and electrically connected to the control output of the switching means for locking the second cover in the first position of the second cover responsive to a first state of the control output and for unlocking the second cover responsive to a second state of the control output.

In a further aspect of the present invention, a detachable remote control adaptor for a radiotelephone is provided including a housing that contains a tone signal decoder for receiving and converting a tone signal received by the radiotelephone into, for example, binary words. In one embodiment the tone signal decoder is configured to releasably attach to the radiotelephone. An interface means is provided for electrically connecting the input of the tone signal decoder to an audio output line of the radiotelephone. A switching means is operatively connected to the output of the tone signal decoder for switching a control output responsive to a tone signal or sequence of tone signals received and converted, for example, to a sequence of binary words, by the tone signal decoder. The switching means may include means for storing a password and means for storing the converted tone signals received by the tone signal decoder. Assembly means are provided in one embodiment for assembling the converted tone signals into a command. Means electrically connected to the storage means generate the control output based on comparing the password and the stored converted tone signal or assembled command. In one aspect of the present invention, a plurality of control outputs may be provided to control various accessory devices and a plurality of passwords may be stored and the control output may be selected based on which of the plurality of passwords corresponds to the converted tone signal or assembled command.

In another aspect of the present invention, the switching means switches the control output to a first state responsive to a first tone signal received and converted by the tone signal decoder (or assembled command) and to a second state responsive to a second tone signal received and converted by the tone signal decoder (or assembled command) and disables switching of the control output responsive to a third tone signal received and converted by the tone signal decoder (or assembled command). The first, second and third tone signals (or assembled commands) may be identical tone signals (or assembled commands) received in sequence. A tone signal generator may also be provided in the housing for generating a tone signal for transmission by the radiotelephone responsive to the switching means when the switching means switches the control output to thereby verify receipt of and an action responsive to the tone signal (or command) received by the remote control adaptor.

In a further aspect of the present invention, the housing may also include a battery. The housing may be configured as a battery pack adapted to releasably connect to the radiotelephone and act as a power source for the radiotelephone and the accessory as well as the remote control adaptor. The switching means may switch the control output between a first state electrically connected to the battery and a second state disconnected from the battery. In another embodiment, the radiotelephone may include an externally accessible system bus which includes a power line. The interface means may connect the switching means to the power line. The switching means may switch the control output between a first state connected to the power line and a second state disconnected from the power line.

Also provided are methods for remote control of ancillary equipment over a cellular network. A communication channel is established over the cellular network to a radiotelephone in the vicinity of the ancillary equipment to be controlled. A tone signal is received by the radiotelephone on the established communication channel. An ancillary equipment control output is then set responsive to the tone signal command received by the radiotelephone. The received tone signal may be a plurality of tone signals received in sequence. In one embodiment a command is assembled from the received tone signal and the ancillary equipment output is set responsive to the assembled command. The command may first be compared to a predetermined password and the control output may be set responsive to the result of the comparison between the command and the predetermined password.

The radiotelephone according to the present invention may be a cellular telephone. More particularly, the cellular telephone in one embodiment may be a digital cellular telephone. The tone signals may include DTMF signals.

Accordingly, the apparatus and methods of the present invention provide various means for remote control of devices without the need for access to a wired telephone line. The benefits of the present invention are provided without requiring a custom designed radiotelephone but instead allow the capability of remote control to be provided to existing radiotelephones through detachable apparatus, docking stations and lock boxes.

BRIEF DESCRIPTION OF THE DRAWINGS

FIG. 2A graphically illustrates a password register structure according to an embodiment of the present invention;

FIG. 3 is an exploded perspective view of an embodiment of a remote control adaptor according to the present invention;

FIG. 4 is an exploded perspective view of a detachable remote control adaptor according to the present invention incorporated into a snap-in radiotelephone battery pack;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
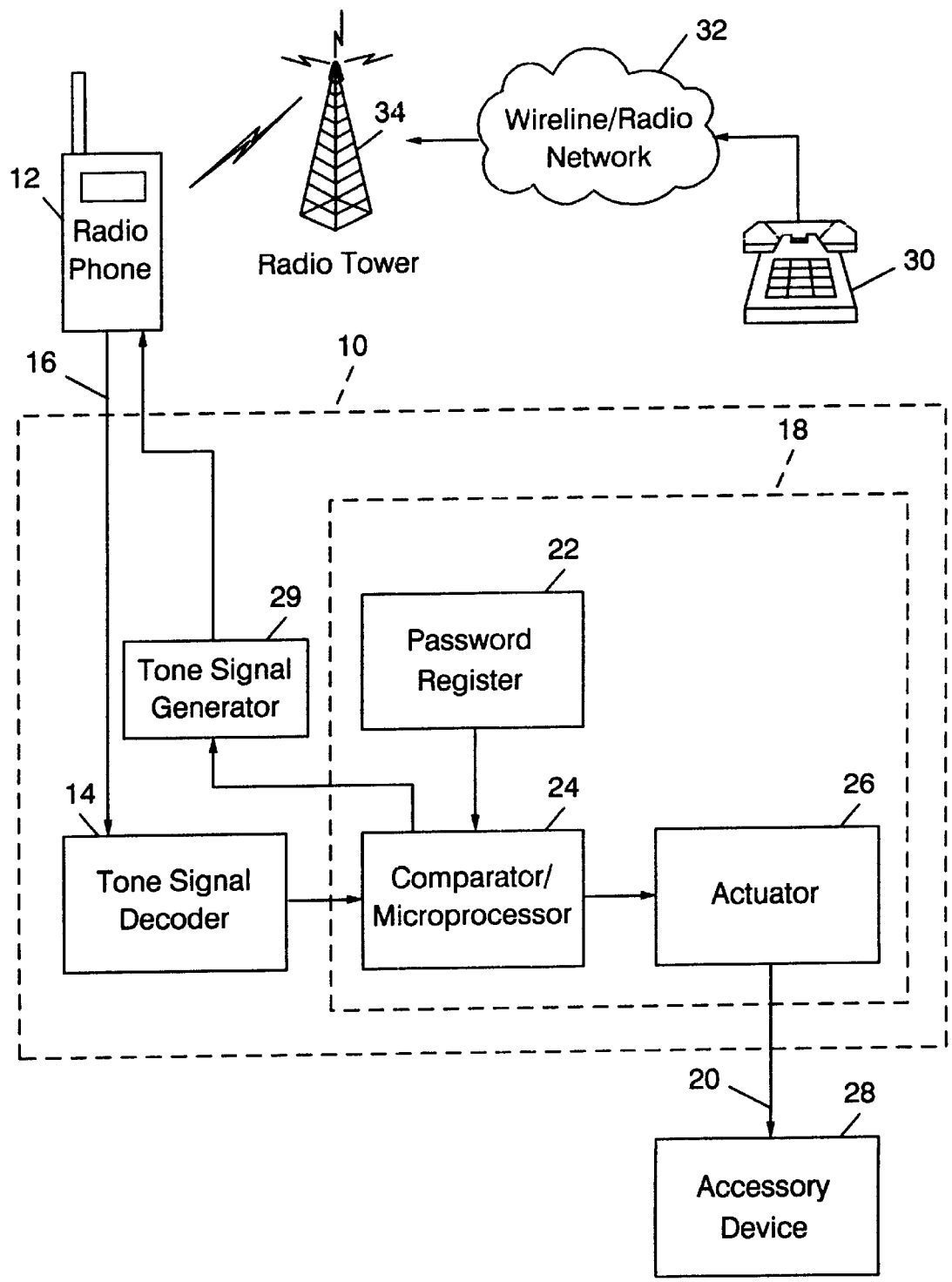
FIG. 1 schematically illustrates an embodiment of a detachable remote control adaptor according to the present invention.

Referring now to FIG. 1, the present invention will now be generally described. Detachable remote control adaptor 10 includes a housing. The housing is configured to releasably attach to radiotelephone 12 as is schematically illustrated in the embodiment of FIG. 1. A tone signal decoder 14 is contained in the housing of adaptor 10 for receiving a tone signal received by radiotelephone 12 and converting the tone signal to a binary word. Detachable cable 16 or other interface means electrically connects tone signal decoder 14 to an audio output line of radiotelephone 12 when adaptor 10 is connected to radiotelephone 12. Control circuit 18 or other switching means is operatively connected to tone signal decoder 14 and switches control output 20 responsive to a tone signal received and converted to binary words by tone signal decoder 14. In the illustrated embodiment microprocessor or comparator 24 further provides means for assembling a command from a plurality of tone signals received in sequence and converted by tone signal decoder 14 and control circuit 18 switches control output 20 responsive to a command assembled from a sequence of tone signals.

In the embodiment of the present invention illustrated in FIG. 1, control circuit 18 includes password register 22 or other means for storing at least one password. Comparator 24 is electrically connected to decoder 14 and provides means for storing a converted tone signal (e.g. sequence of binary words) provided by decoder 14 and for assembling these binary words into a command. Comparator 24 is similarly electrically connected to password register 22 and provides a means for comparing the password and the assembled command. Actuator 26 switches control output 20 responsive to the comparison of the password and assembled command by comparator 24. As will be described further herein, control output 20 may be a single on/off toggle switch, a plurality of outputs to control a plurality of accessory devices or a nonbinary state output depending upon the requirements of the devices to be controlled. As illustrated in FIG. 1, control output 20 is a single output line controlling accessory device 28.

A user desiring to control an accessory through detachable remote control adaptor 10 accesses telephone 30 having tone signal generating keys, for example, DTMF signal generating keys. The user dials the phone number of radiotelephone 12 to establish a communication link to radiotelephone 12 over network 32 to radio tower 34 of the wide area cellular network cell in which radiotelephone 12 is located. Telephone 30 may be a wire line telephone and network 32 may be a wire line public switched telephone network. Alternatively, telephone 30 may also be a cellular telephone and network 32 may be a radiotelephone network. After a communication link is established, the user inputs a command comprising a sequence of tone signals on telephone 30 which is received by radiotelephone 12 and remote control adaptor 10 establishes control output 20 to control accessory device 28.

In the illustrated embodiment of FIG. 1, adaptor 10 also includes tone signal generator 29 or other means for generating a signal confirming receipt of a command to the requesting source telephone 30 over the established connection. Tone signal generator 29 may generate a tone signal for transmission or, alternatively, initiate both generation and transmission of the tone signal or other signal by radiotelephone 12.

Figure 2:
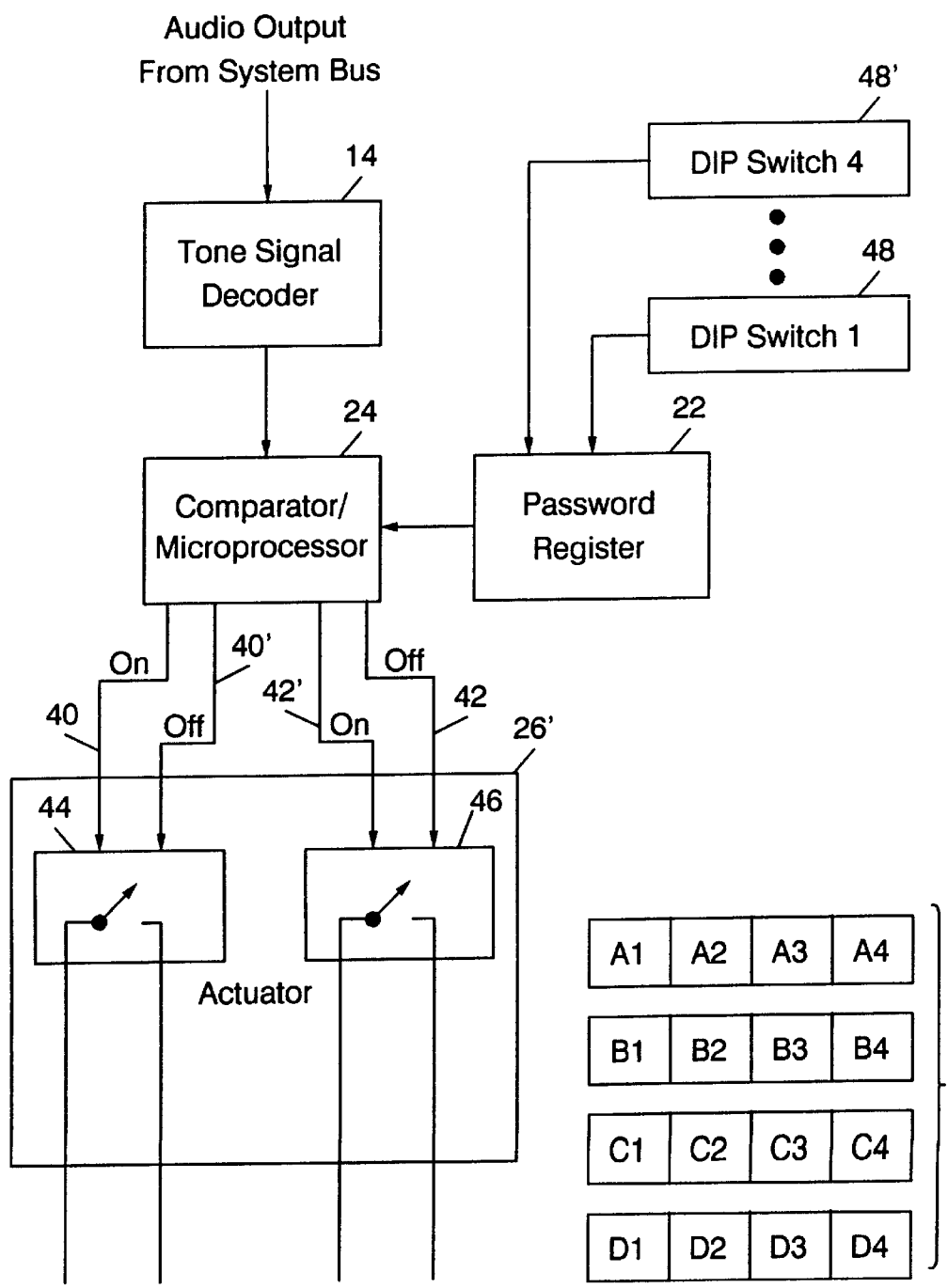
FIG. 2 schematically illustrates another embodiment of a detachable remote control adaptor according to the present invention.

Referring now to FIGS. 2 and 2A, an embodiment of the electronic circuitry of remote control adaptor 10 is illustrated. As illustrated in FIG. 2, tone signal decoder 14 is electrically connected to the radiotelephone system bus over which incoming audio signals are conveyed from the radiotelephone 12 to remote control adaptor 10. Decoder 14 examines the audio signals, detects the presence of tone signals, decodes these signals, and passes the resulting sequence of four-bit binary words to comparator 24. Comparator 24 assembles the four-bit binary words into a sixteen-bit command and compares the assembled command to a predetermined list of passwords from password register 22. As illustrated in FIG. 2, remote control adaptor 10 supports the use of four sixteen-bit passwords, thereby enabling the operation of four commands with some degree of security. When a sequence of incoming tone signals conveys a command that matches one of the pre-established passwords, comparator 24 raises a particular output line controlling actuator 26'.

The structure of password register 22 is illustrated in FIG. 2A. As shown in FIG. 2A, each of the four passwords A, B, C, D is sixteen-bits long. Each four-bit segment of each sixteen-bit password, for example, segments A1, A2, A3 and A4 of password A, corresponds to a four-bit binary word that represents a decoded tone signal. For example, segment $B_3$ might be the four-bit binary word 0110, which generally corresponds to the DTMF signal generated by pressing the 6 key on a touch-tone telephone.

Referring again to FIG. 2, actuator 26' is shown as having two control outputs to accessory devices 28, 28' (not shown). Comparator 24 assembles four sequential four-bit binary words from decoder 14 into a command and compares the assembled command to the four passwords in password register 22. If a match is found, comparator 24 raises output line 40, 40', 42 or 42' responsive to the match. Line 40 is an ON control line for switch 44 and 40' is an OFF command line for switch 44. Similarly, lines 42 and 42' control the ON/OFF state of switch 46. It is to be understood that, alternatively, line 40 and 40' and line 42 and 42' respectively may be embodied as two rather than four lines with, for example, a low voltage state representing the OFF state and a high voltage state representing the ON state. As illustrated in the embodiment of FIG. 2, a plurality of passwords may be loaded into remote control adaptor 10 using dip switches 48, 48'. In the illustrated embodiment, each dip switch is a 16-bit switch representing four 4-bit binary words, each corresponding to a decoded tone signal. In one example, two passwords could be recognized by adaptor 10, one to power up the remote device and one to power down. Alternately, a bistable latch or sequential stepping latch may be provided so that, for example, a first recognition of a password authorizes power up, a second recognition of the same password authorizes power down, and a third recognition disables adaptor 10 to prevent further remote activation.

One or more passwords are preloaded into password register 22 from dip switches 48, 48'. Adaptor 10 is connected to radiotelephone 12 which is set on auto answer and radiotelephone 12 with adaptor 10 connected is co-located with an accessory device 28 to be controlled remotely. To control accessory device 28, a user dials up radiotelephone 12 which answers the incoming call. Once the call is established, the user enters a command by DTMF keying. The command is passed as a sequence of audio tone signals via network tower 34 to radiotelephone 12, then from radiotelephone 12 to tone signal decoder 14. Tone signal decoder 14 decodes the incoming tone signals and passes the resulting sequence of four-bit binary words to comparator 24. Comparator 24 assembles a command from the sequence of binary words and compares the assembled command to the passwords loaded earlier. If a match is found, comparator 24 opens or closes switch 44, 46 to power up or power down an accessory device 28 to be controlled and the call is terminated.

Although the present invention has been described in terms of passwords loaded by a user through DIP switches, it is to be understood that the benefits of the present invention may also be obtained through the use of other means. For example, the passwords may be factory or otherwise pre-established and held in, for example, ROM with the passwords serving to identify and differentiate various commands, rather than to provide security against accidental or unauthorized use. It is further to be understood that other storage means, such as EEPROMs or SRAMs could be used which may provide the user the ability to change passwords.

Referring now to FIG. 3, an embodiment of a detachable remote control adaptor 10 according to the present invention is illustrated showing its attachment to a radiotelephone 12. As shown in FIG. 3, the self-contained adaptor 10 attaches to radiotelephone 12 by means of plug 50 which is inserted into the external access port 52 of the radiotelephone system bus. In the embodiment illustrated in FIG. 3, two separate control outputs are shown from accessory 10.

Figure 3A:
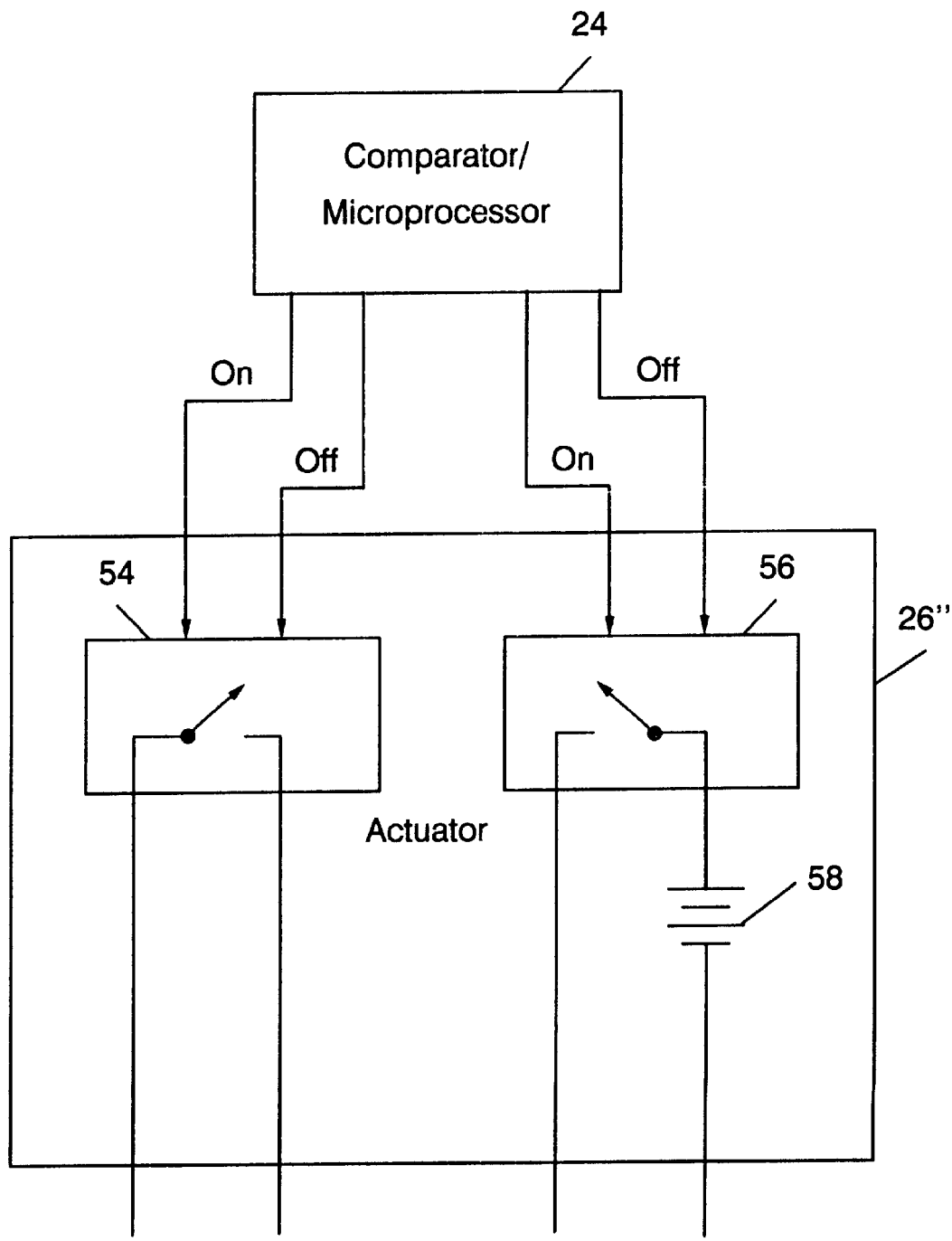
FIG. 3A schematically illustrates a further embodiment of the control logic of a remote control adaptor according to the present invention.

Referring now to FIG. 3A, the two control outputs are shown actuating two separate embodiments of switches 54, 56, in actuator 26". As illustrated in FIG. 3A, switch 56 is electrically connected to power source 58. While power source 58 is schematically illustrated as a component of actuator 26" in FIG. 3A, in the embodiment of FIGS. 3 and 3A, the power source is preferably obtained from the battery of radiotelephone 12 through a power line accessible through external access port 52 of the system bus of radiotelephone 12. Switch 56 then selectively connects accessory device 28 to the power line of the system bus of radiotelephone 12.

Figure 4A:
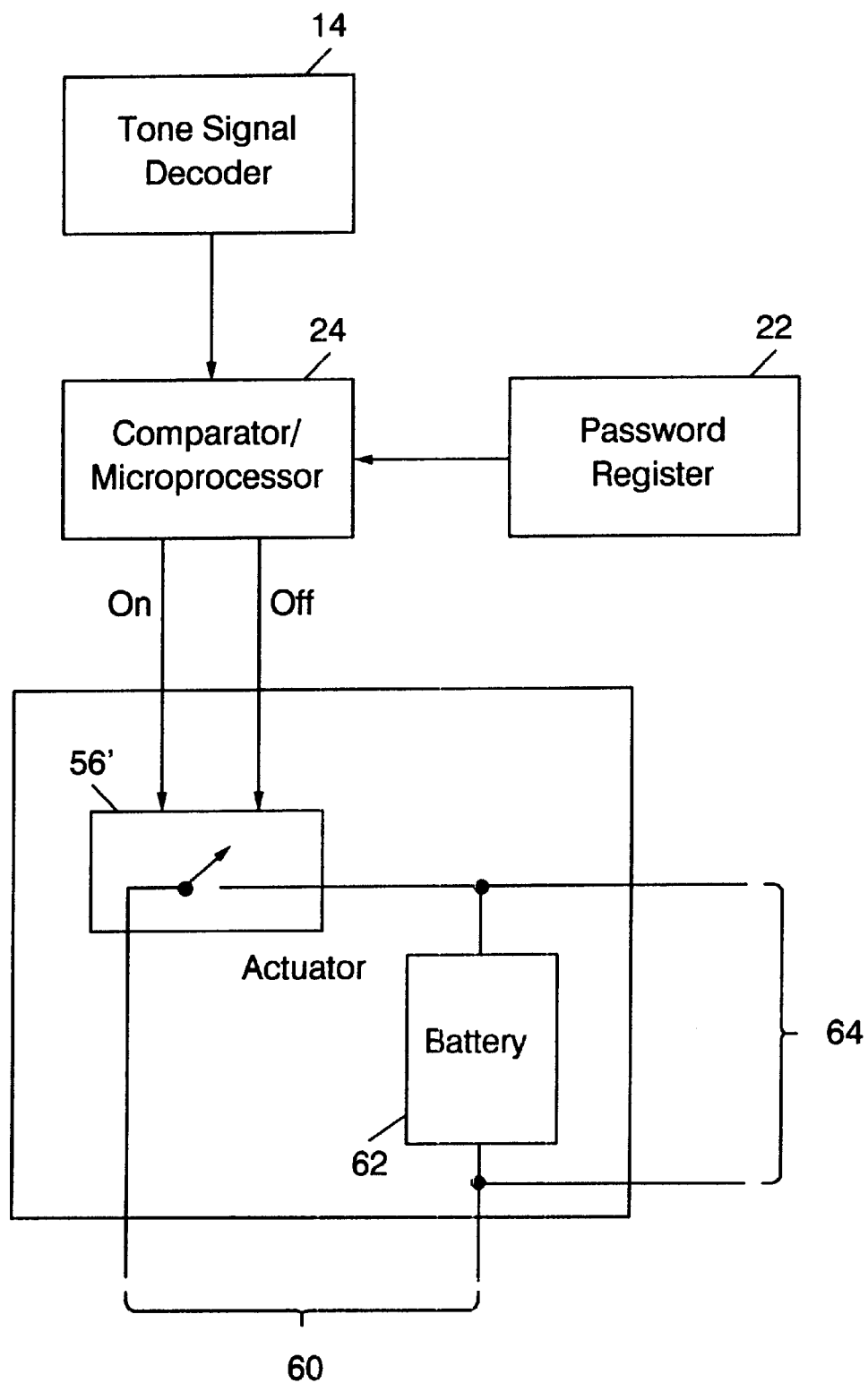
FIG. 4A schematically illustrates the circuitry of the present invention according to the embodiment illustrated in FIG. 4.

An alternative embodiment of the present invention is illustrated in the exploded perspective view of FIG. 4. As illustrated in FIG. 4, detachable remote control adaptor 10 is provided incorporated into a battery pack that is structurally compatible with the rechargeable battery socket of radiotelephone 12. A short flexible cable 16 terminated by connector 16' provides an interface between adaptor 10 and external access port 52 of radiotelephone 12 to thereby provide a connection between tone signal decoder 14 and an audio output line from radiotelephone 12. Power socket 60 provides a control output 20 to an accessory device 28 which provides an electrical connection to rechargeable battery cells 62 for powering accessory device 28 as illustrated in FIGS. 4 and 4A. As shown in FIG. 4A, detachable remote control adaptor 10 includes two output ports. Output port 64 is a conventional external plug-in battery pack connection configured to connect to radiotelephone 12. Output port 60 provides the control output to an accessory device 28 to be controlled, providing a switched power connection to rechargeable battery cells 62. Also illustrated in FIG. 4A are switch 56' and actuator 26", 26'". The embodiment of FIGS. 4 and 4A provides an adaptor which conveniently becomes physically integral to radiotelephone 12 just as a normal removable rechargeable battery pack is physically attached to radiotelephone 12. Furthermore, by integrating rechargable battery cells 62 into adaptor 10, a higher current may be provided to accessory device 28 because the DC path taken directly from battery cells 62 is not limited by the current carrying capacity of the radiotelephone system bus.

Figure 5:
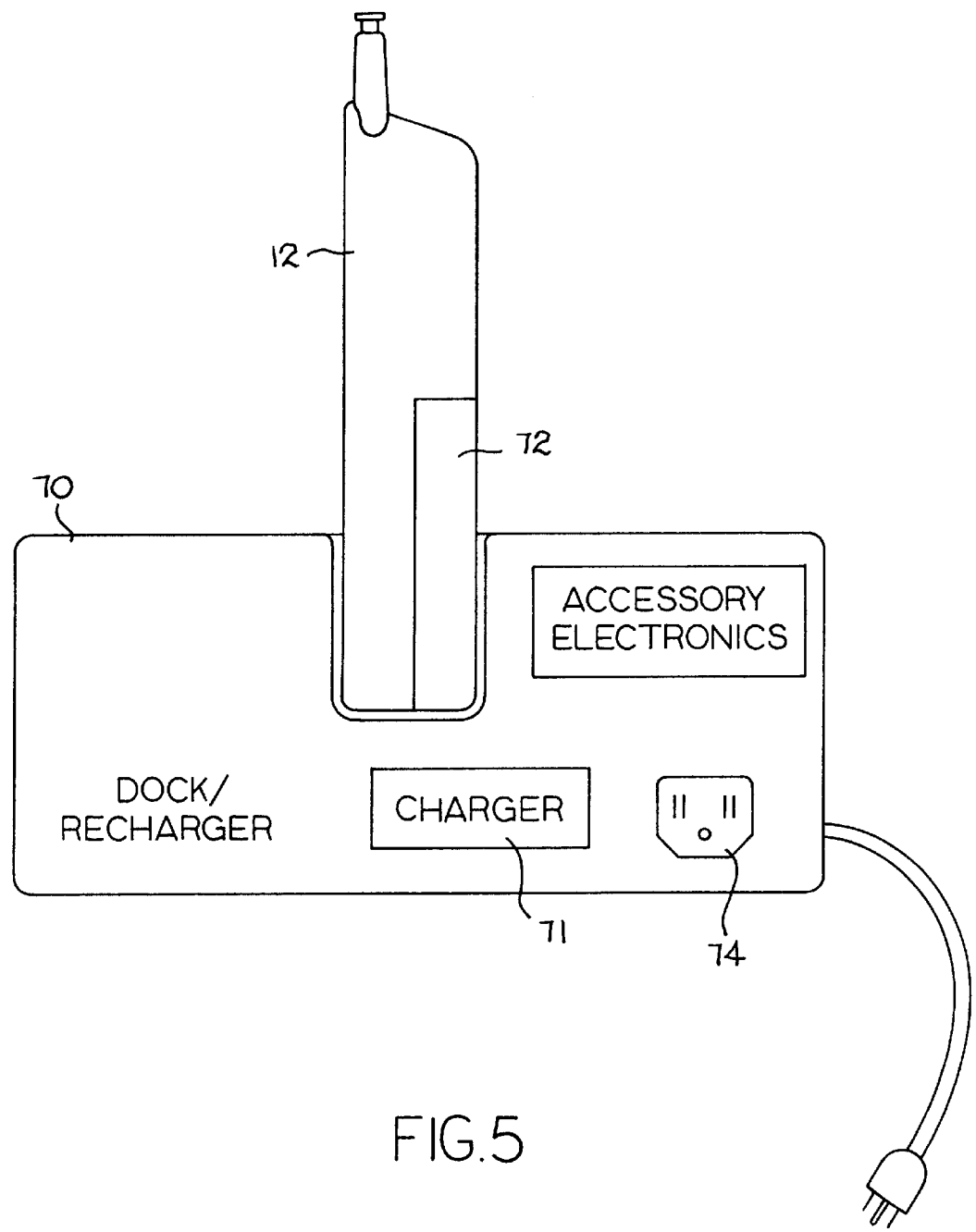
FIG. 5 is a perspective view of a remote control docking station according to the present invention.

FIG. 5 illustrates an embodiment of the present invention as a remote control docking station 70 for battery powered radiotelephone 12. Docking station 70 is provided as a recharging station for battery powered radiotelephone 12 typically for at home use. In this embodiment, the present invention provides an at home device which can be operated remotely as an alternative to a wireline telephone, for example, for use in a vacation cottage, or as a back-up to a wireline telephone, for example, for use with a security system.

Docking station 70 is contained in a portable housing and includes a battery charger 71 which may be used to charge the rechargable battery of radiotelephone 12. As illustrated previously with respect to the adaptor 10 of the present invention, remote control docking station 70 includes a tone signal decoder 14 for receiving and converting tone signals received by a radiotelephone 12 inserted in the housing of docking station 70. Docking station 70 further includes a receptacle or other means for receiving radiotelephone 12 and providing electrical interface therewith electrically connecting battery charger 71 of docking station 70 to the rechargable battery pack 72 of radiotelephone 12 and further providing an electrical connection between tone signal decoder 14 and an audio output line of radiotelephone 12. The control electronics of docking station 70 are otherwise similar to those illustrated generally in FIG. 1 and in the embodiments of FIGS. 2A and 3A including a switching means 18 operatively connected to tone signal decoder 14 for switching a control output 20 responsive to a tone signal received and converted by decoder 14. More particularly, switching means 18 switches control output 20 responsive to a sequence of tone signals received by decoder 14 and assembled into a command by comparator 24.

Docking station 70, in the embodiment illustrated in FIG. 5, further includes a power line connecting means 74 connecting docking station 70 to an external power source such as a household AC power outlet. As illustrated in FIG. 5, control output 20 (see FIG. 1) may selectively connect to the battery charger 71 of docking station 70 which is typically a DC power source or may switch the control output connection to the external power source via connecting means 74. It is to be understood that the benefits of the docking station 70 according to the present invention may be obtained with a DC external power source such as, for example, a car vehicle battery in an embodiment where the docking station is mounted in a vehicle rather than in a user's home.

Figure 6:
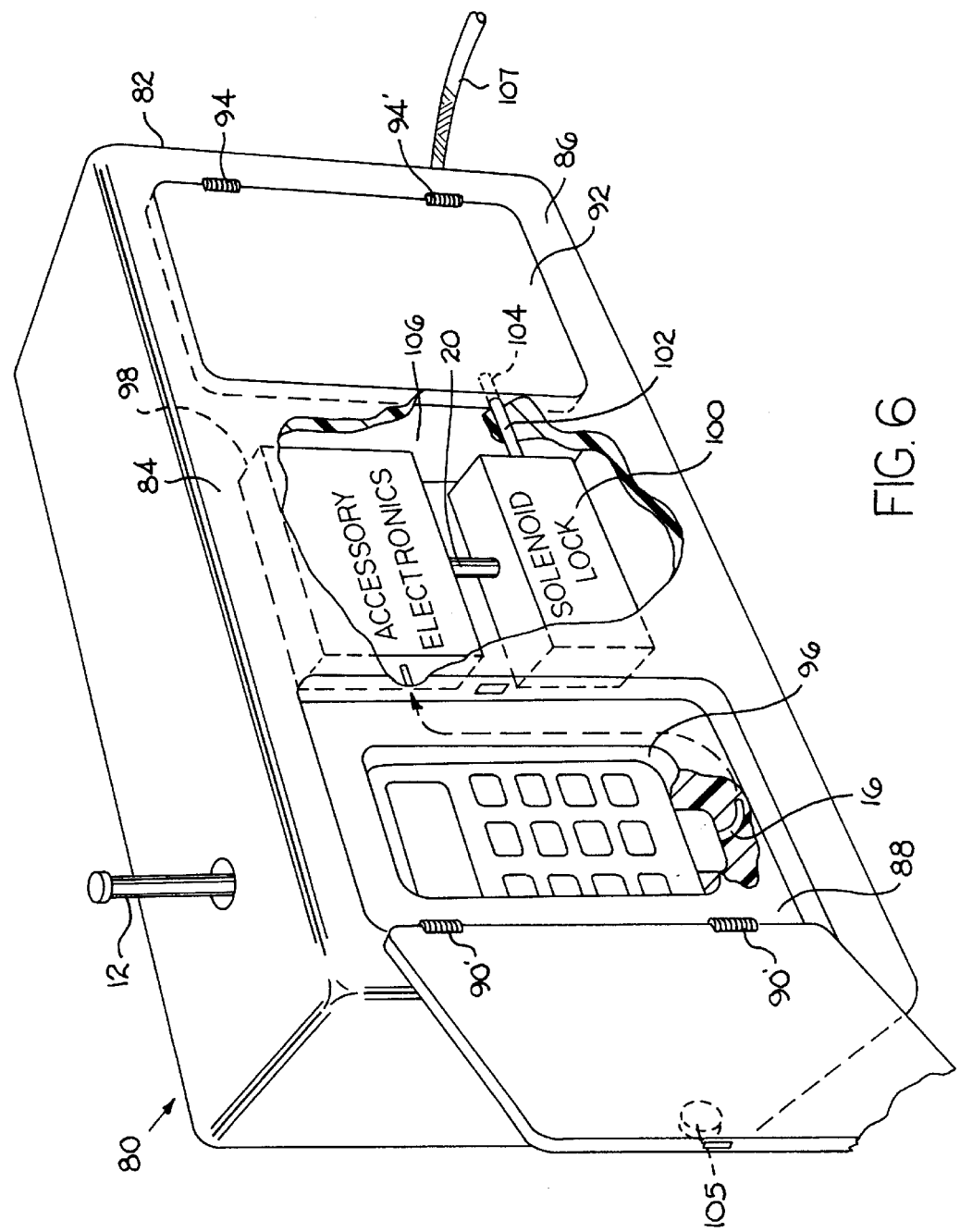
FIG. 6 is a perspective view of an embodiment of a remote control lock box according to the present invention.

Referring now to FIG. 6, an embodiment of the apparatus of the present invention as a remote control lock box 80 for radiotelephone 12 is illustrated.

Lock box 80 includes housing 82. Housing 82 has a first compartment 84 and a second compartment 86 therein. Cover 88 is rotatably connected to housing 82 by hinges 90, 90'. Cover 88 has a first position substantially closing off access to compartment 84 and a second position providing access to compartment 84. Second cover 92 is rotatably connected to housing 82 by hinges 94, 94'. Cover 92 has a first position substantially closing off access to compartment 86 and a second position allowing access to compartment 86.

Cradle 96 or other mounting means is provided in first compartment 84 for mounting radiotelephone 12 within compartment 84. Accessory electronics 98 are also provided in lock box 80. As illustrated in the embodiment of FIG. 6, the accessory electronics 98 are located in first chamber 84. Accessory electronics 98 include tone signal decoder 14 (see e.g., FIG. 1) for receiving and converting tone signals received by radiotelephone 12 when it is installed in cradle 96 and interface means 16 for electrically connecting tone signal decoder 14 to an audio output line of radiotelephone 12 when it is positioned in cradle 96. Embodiments of the accessory electronics 98 are illustrated in FIGS. 1 and 2A.

Solenoid actuated lock 100 or other locking means is provided in housing 82 and electrically connected to the control output 20 of accessory electronics 98 for locking cover 92 in its first or closed position responsive to a first state of control output 20 and for unlocking cover 92 to allow access to chamber 86 responsive to a second state of control output 20. In the illustrated embodiment of FIG. 6, solenoid lock 100 comprises a plunger 102 which is movably actuated by solenoid lock 100 to engage and disengage from locking receptable 104 on cover 92. Cover 92 is preferably spring loaded to the first or closed position.

When utilizing the remote control lock box 80 of the present invention, compartment 86 of lock box 80 may be remotely opened thereby revealing, for example, a mechanical key to a mechanical lock. The purpose of this embodiment of the invention is similar to the purpose of a real estate agent's lock box which is used to provide controlled access to a residential dwelling. For example, a plumber seeking access to a residence calls the homeowner at the homeowner's office. The homeowner operates the lock box 80 by remote control thereby exposing a mechanical key needed by the plumber to enter the residence. In this configuration, cellular phone 12 is detachable from lock box 80 so that cellular phone 12 may be used for other purposes, such as telephone communications, when lock box 80 is not in use. Lock box 80 is, preferably, tethered to a secure structure by hardened fastener 107 or other locking means to prevent theft. Cover 88, which allows access to chamber 84 for installing radiotelephone 12, may be secured in the closed position by access lock 105 to prevent theft of radiotelephone 12 when it is mounted in lock box 80. Lock box 80 may be manufactured from steel or other appropriately theft-resistant material. Chambers 84 and 86 are separated by partition wall 106 to prevent access to radiotelephone 12 when solenoid lock 100 is activated to allow access to chamber 86 by unlocking cover 92.

In one embodiment, solenoid lock 100 may be activated by control output 20 to a first state responsive to a first command comprising a sequence of tone signals received and converted by tone signal decoder 14 to allow access to chamber 86 and responsive to a second command locking cover 92 and finally solenoid lock 100 may be disabled from state change by remote activation responsive to a third command to prevent further remote unlocking of cover 92. Each of the first, second and third commands may be identical or, alternatively, may be distinct.

Figure 6A:
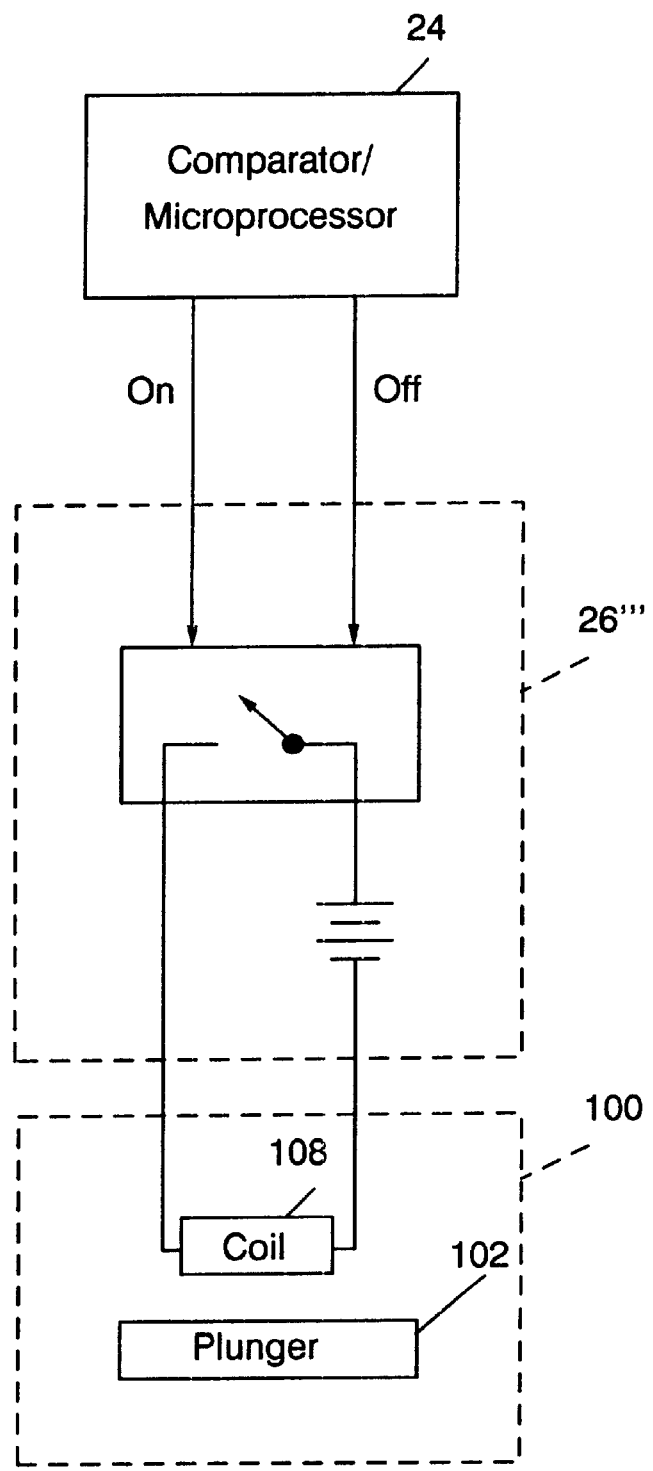
FIG. 6A is a schematic illustration of an actuator switch and a solenoid lock for the embodiment of the present invention illustrated in FIG. 6.

An embodiment of solenoid lock 100 is schematically illustrated in FIG. 6A. Solenoid lock 100 includes coil 108 which may be energized to move plunger 102 into or out of engagement with locking receptable 104.

As will be appreciated by those of skill in this art, the above described aspects of the various embodiments of the apparatus of the present invention as discussed in connection with the electronic circuits of FIGS. 1–6A may be provided by hardware, software, or a combination thereof. While the various components of adaptor 10, docking station 70 and the accessory electronics 98 of lock box 80 have been illustrated in the figures as discrete elements, they may in practice be implemented by a microcontroller including input and output ports and running software code, by custom or hybrid chips, by discrete components or by a combination of the above. For example, comparator 24, password register 22, switch 26 and the storage means for converted received tone signals from tone signal decoder 14 may all be implemented as a single programmable device.

Radiotelephone 12 according to the present invention may be a cellular telephone. More particularly, the benefits of the present invention may be obtained with both analog or digital type cellular telephone systems. It is to be understood that "cellular telephone" refers to any of a variety of known mobile receiving units for use with cell-based frequency-reuse systems such as wide area cellular networks which may also be referred to as personal communication systems. Likewise, while not illustrated herein, it is to be understood by one of ordinary skill in the art that the benefits of remote activation of accessory devices according to the present invention may also be obtained with satellite communication systems.

Figure 7:
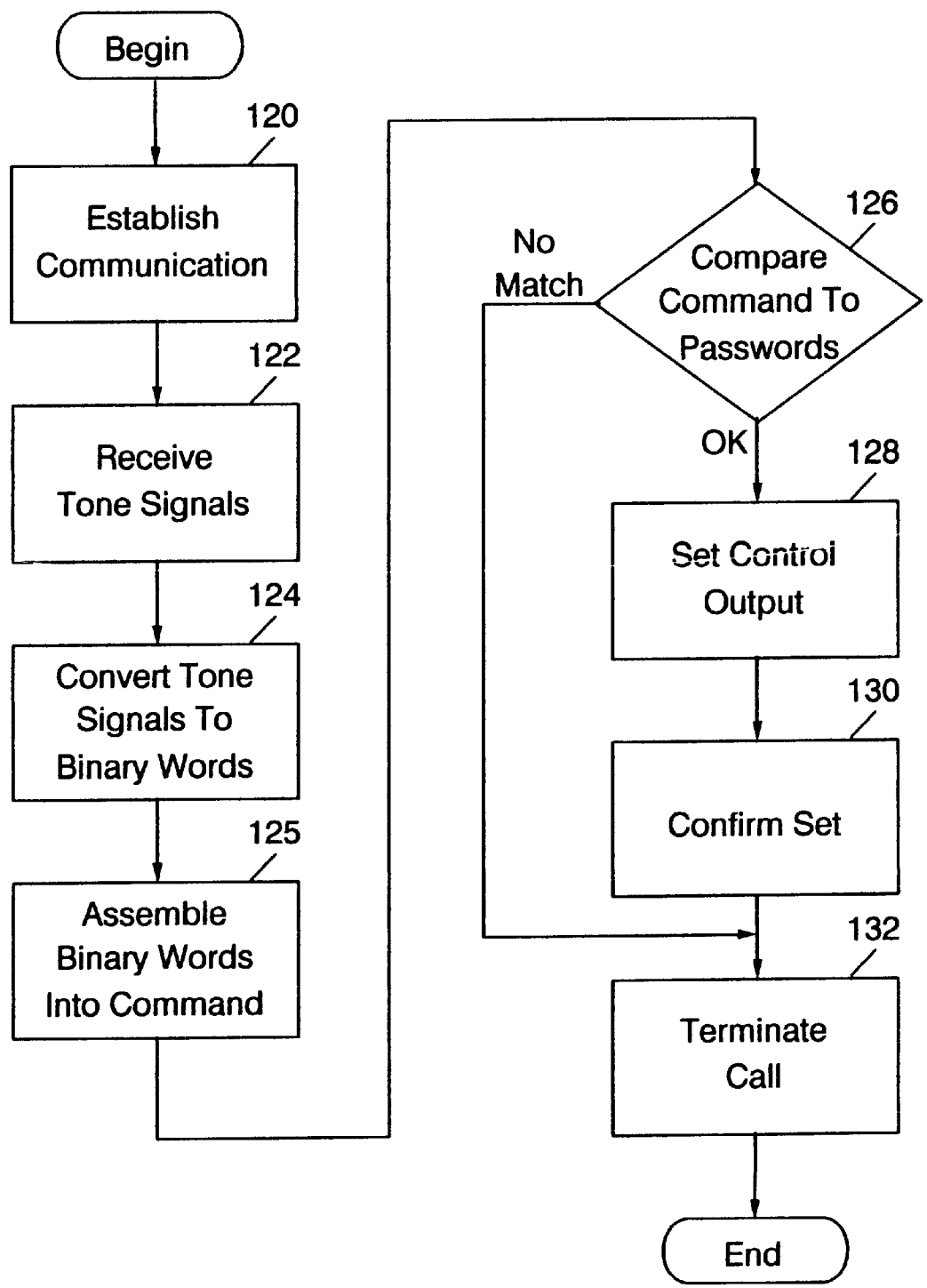
FIG. 7 is a flow chart illustrating operations of remote control adaptor according to an embodiment of the present invention.

Referring now to FIG. 7, an embodiment of the operations for remote control operation of ancillary equipment over a wide area cellular network according to the methods of the present invention will now be described. Radiotelephone 12 establishes a communication over a wide area cellular network at block 120. It is to be understood that the wide area cellular network as discussed above for the apparatus may be land based or satellite based communications. After a communication is established over network 32 from a requesting user, a one or more tone signals is received at radiotelephone 12 on the established communication link at block 122. In the illustrated embodiment a sequence of tone signals is received. The sequence of tone signals is provided to and received by decoder 14 and converted to a sequence of binary words at block 124. The sequence of binary words is assembled into a command at block 125. In the illustrated embodiment of the methods of the present invention, the assembled command is compared to the list of predetermined passwords at block 126. If a match is detected during the compare step at block 126, a selected control output is set to a desired state at block 128 to control ancillary device 28 responsive to the command received by radiotelephone 12. Optionally, in one embodiment of the present invention, the setting of the control output at block 128 is confirmed at block 130. The confirming of setting of the control output at block 130 may be implemented by providing a tone signal generator 29 in adaptor 10, docking station 70 or lock box 80 or alternatively, by providing an initiating output activating a tone signal generator present in radiotelephone 12 over the system bus of radiotelephone 12. The remote control communication call is then terminated at block 132.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A remote control docking station for a battery powered radiotelephone comprising:

a portable housing;

a battery charger in said housing;

a tone signal decoder in said housing for receiving and converting a tone signal received by said radiotelephone;

means in said housing for receiving said radiotelephone and providing electrical interface therewith electrically connecting said battery charger to said battery and further electrically connecting said tone signal decoder to an audio output line of said radiotelephone when said radiotelephone is in said housing; and switching means in said housing and operatively connected to said tone signal decoder for switching a control output responsive to a tone signal received and converted by said tone signal decoder.

2. A remote control docking station according to claim 1 wherein said switching means is electrically connected to said battery charger and wherein said switching means switches said control output between a first state electrically connected to said battery charger and a second state disconnected from said battery charger.

3. A remote control docking station according to claim 1 further comprising:

power line connecting means in said housing for connecting said remote control docking station to a power source; and wherein said switching means is electrically connected to said power source and wherein said switching means switches said control output between a first state electrically connected to said power source and a second state disconnected from said power source.

4. A remote control docking station according to claim 3 wherein said power source is an alternating current power source.

5. A remote control docking station according to claim 1 wherein said radiotelephone is a cellular telephone.

6. A remote control lock box for a radiotelephone comprising:

a housing having a first and a second compartment;

a first cover connected to said housing and having a first position so as to substantially close said first compartment and a second position so as to provide access to said first compartment;

a second cover connected to said housing and having a first position so as to substantially close said second compartment and a second position so as to provide access to said second compartment;

mounting means in said first compartment for mounting said radiotelephone within said first compartment;

a tone signal decoder connected to said housing for receiving and converting a tone signal received by said radiotelephone when said radiotelephone is in said mounting means;

interface means for electrically connecting said tone signal decoder to an audio output line of said radiotelephone when said radiotelephone is in said mounting means;

switching means operatively connected to said tone signal decoder for switching a control output responsive to a tone signal received and converted by said tone signal decoder; and locking means in said housing and electrically connected to said control output of said switching means for locking said second cover in said first position of said second cover responsive to a first state of said control output and for unlocking said second cover responsive to a second state of said control output.

7. A remote control lock box for a radiotelephone according to claim 6 wherein said switching means further comprises:

comparing means for switching said control output;

means electrically connected to said comparing means for storing a password;

means electrically connected to said comparing means for storing a converted tone signal received by said tone signal decoder; and wherein said comparing means switches said control output based on comparing said password and said stored converted tone signal.

8. A remote control lock box for a radiotelephone according to claim 7 further comprising means responsive to said tone signal decoder for assembling a command from a plurality of stored converted tone signals and wherein said means for switching said control output comprises means electrically connected to said assembling means for switching said control output based on comparing said password and said assembled command.

9. A remote control lock box for a radiotelephone according to claim 6 wherein said switching means switches said control output to a first state responsive to a first tone signal received and converted by said tone signal decoder and to a second state responsive to a second tone signal received and converted by said tone signal decoder and disables switching of said control output responsive to a third tone signal received and converted by said tone signal decoder.

10. A remote control lock box for a radiotelephone according to claim 9 wherein said first, second and third tone signals are identical.

11. A remote control lock box for a radiotelephone according to claim 6 wherein said radiotelephone is a cellular telephone.

12. A detachable remote control adaptor for a radiotelephone comprising:

a housing configured to releasably attach directly to said radiotelephone;

a tone signal decoder in said housing for receiving and converting a tone signal received by said radiotelephone;

interface means for electrically connecting said tone signal decoder to an audio output line of said radiotelephone when said adaptor is connected to said radiotelephone; and switching means operatively connected to said tone signal decoder for switching a control output responsive to a tone signal received and converted by said tone signal decoder;

wherein said switching means further comprises:
means for storing a plurality of passwords;
means for storing the converted tone signal received by said tone signal decoder;
means responsive to said tone signal decoder for assembling a command from a plurality of stored converted tone signals;
means electrically connected to said means for storing a password and said means for storing the converted tone signal for switching a selected one of a plurality of control outputs based on which of said plurality of passwords corresponds to an assembled command;

wherein said switching means switches one of said plurality of control outputs to a first state responsive to a first command received and assembled by said assembly means and to a second state responsive to a second command received and assembled by said assembly means and disables switching of said one of said plurality of control outputs responsive to a third command received and assembled by said assembly means; and wherein said first, second and third commands are identical.

13. A remote control docking station for a battery powered radiotelephone comprising:

a portable housing;

a battery charger in said housing;

a tone signal decoder in said housing that receives and converts a tone signal received by said radiotelephone;

a receptacle in said housing configured to receive said radiotelephone, said receptacle including an electrical interface electrically connected to said battery charger and to said tone signal decoder, the electrical interface configured to connect said tone signal decoder to an audio output line of said radiotelephone and said battery charger to a battery in said radiotelephone when said radiotelephone is in said receptacle; and a switch in said housing and operatively connected to said tone signal decoder that switches a control output responsive to a tone signal received and converted by said tone signal decoder.

14. A remote control lock box for a radiotelephone comprising:

a housing having a first and a second compartment;

a first cover connected to said housing and having a first position so as to substantially close said first compartment and a second position so as to provide access to said first compartment;

a second cover connected to said housing and having a first position so as to substantially close said second compartment and a second position so as to provide access to said second compartment;

a receptacle in said first compartment configured to receive said radiotelephone within said first compartment;

a tone signal decoder connected to said housing that receives and converts a tone signal received by said radiotelephone when said radiotelephone is in said receptacle;

an electrical interface that electrically connects said tone signal decoder to an audio output line of said radiotelephone when said radiotelephone is in said receptacle; a switch operatively connected to said tone signal decoder that switches a control output responsive to a tone signal received and converted by said tone signal decoder; and a lock in said housing and electrically connected to said control output of said switching, said lock having a first position that locks said second cover in said first position of said second cover responsive to a first state of said control output and a second position that unlocks said second cover responsive to a second state of said control output.

15. A detachable remote control adaptor for a radiotelephone comprising:

a housing;

a tone signal decoder in said housing for receiving and converting a tone signal received by said radiotelephone;

means responsive to said tone signal decoder for assembling a command from a plurality of stored converted tone signals;

interface means for electrically connecting said tone signal decoder to an audio output line of said radiotelephone when said adaptor is connected to said radiotelephone; and switching means operatively connected to said tone signal decoder for switching a control output responsive to a tone signal received and converted by said tone signal decoder;

wherein said switching means further comprises:
means for storing a password;
means for storing the converted tone signal received by said tone signal decoder;
means electrically connected to said means for storing a password and said means for storing the converted tone signal for switching said control output based on comparing the password and the assembled command;
wherein said switching means switches said control output to a first state responsive to a first command received and assembled by said assembly means and to a second state responsive to a second command received and assembled by said assembly means and disables switching of said control output responsive to a third command received and assembled by said assembly means; and
wherein said first, second and third commands are identical.

* * * * *

UNITED STATES PATENT AND TRADEMARK OFFICE
CERTIFICATE OF CORRECTION

PATENT NO.    : 6,192,236 B1                                              Page 1 of 1
DATED         : February 20, 2001
INVENTOR(S)   : Irvin et al.

It is certified that error appears in the above-identified patent and that said Letters Patent is hereby corrected as shown below:

<u>Title page,</u>
Item [54], the invention title should read as follows:

-- APPARATUS FOR REMOTE CONTROL OF ACCESSORY DEVICES USING A RADIOTELEPHONE AS A RECEIVER --

Signed and Sealed this

First Day of October, 2002

Attest:

Attesting Officer

JAMES E. ROGAN
*Director of the United States Patent and Trademark Office*